(12) United States Patent
Sakata et al.

(10) Patent No.: US 7,576,313 B2
(45) Date of Patent: Aug. 18, 2009

(54) LIGHT SOURCE DEVICE AND IMAGE DISPLAY DEVICE

(75) Inventors: Hidefumi Sakata, Tatsuno-cho (JP); Takashi Takeda, Suwa (JP); Masatoshi Yonekubo, Hara-mura (JP); Susumu Aruga, Simosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 549 days.

(21) Appl. No.: 11/288,385

(22) Filed: Nov. 29, 2005

(65) Prior Publication Data

US 2006/0114664 A1 Jun. 1, 2006

(30) Foreign Application Priority Data

Dec. 1, 2004 (JP) ............... 2004-348234

(51) Int. Cl.
*G02F 1/01* (2006.01)
*G03B 21/14* (2006.01)
*G02B 5/30* (2006.01)
*F21V 9/14* (2006.01)

(52) U.S. Cl. .................. 250/225; 353/20; 359/483; 362/19

(58) Field of Classification Search ............. 250/225; 348/E9.027, E5.138, E5.137, E5.139; 362/19, 362/234; 353/20, 31; 359/483–501
See application file for complete search history.

(56) References Cited

U.S. PATENT DOCUMENTS

| | | | |
|---|---|---|---|
| 6,336,724 B1 * | 1/2002 | Shouji et al. ............... 353/20 |
| 6,726,329 B2 * | 4/2004 | Li et al. ................. 353/20 |
| 6,808,269 B2 | 10/2004 | Cobb | |
| 6,857,761 B2 | 2/2005 | Chang | |
| 6,882,379 B1 * | 4/2005 | Yokoyama et al. ............ 349/61 |
| 7,192,147 B2 | 3/2007 | Sakata et al. | |
| 2003/0193649 A1 * | 10/2003 | Seki ............................. 353/20 |
| 2004/0070970 A1 * | 4/2004 | Chang ....................... 362/234 |
| 2005/0185140 A1 | 8/2005 | Matsubara et al. | |
| 2007/0121310 A1 | 5/2007 | Sakata et al. | |

FOREIGN PATENT DOCUMENTS

| | | |
|---|---|---|
| EP | 1 363 460 A2 | 11/2003 |
| EP | 1 575 307 A2 | 9/2005 |
| JP | A-05-034638 | 2/1993 |
| JP | A-05-181089 | 7/1993 |
| JP | A-08-029734 | 2/1996 |
| JP | A 2000-221499 | 8/2000 |

(Continued)

*Primary Examiner*—Que T Le
*Assistant Examiner*—Jennifer Bennett
(74) *Attorney, Agent, or Firm*—Oliff & Berridge, PLC

(57) ABSTRACT

A light source device includes at least two light emitting parts which emit light; and a polarization separating part which transmits polarized light in a first vibrating direction of the lights from the light emitting part, and reflects polarized light in a second vibrating direction nearly orthogonal to the first vibrating direction, thereby to separate the lights from the light emitting part into the polarized light in the first vibrating direction and the polarized light in the second vibrating direction. Herein, the light emitting part includes a reflection part which reflects light that travels toward the light emitting part from the polarization separating part, in the direction of the polarization separating part. The polarization separating part synthesizes the polarized light in the first vibrating direction that has passed through the polarization separating part, and the polarized light in the second vibrating direction that has reflected on the polarization separating part, thereby to cause the synthesized light to travel in a predetermined direction.

6 Claims, 9 Drawing Sheets

FOREIGN PATENT DOCUMENTS

| | | |
|---|---|---|
| JP | A-2001-305657 | 11/2001 |
| JP | A 2003-57445 | 2/2003 |
| JP | A-2003-270588 | 9/2003 |
| JP | A-2003-329978 | 11/2003 |
| JP | A-2003-347595 | 12/2003 |
| JP | A-2004-070018 | 3/2004 |
| JP | A-2004-133388 | 4/2004 |
| JP | A-2004-177444 | 6/2004 |
| JP | A 2004-354881 | 12/2004 |
| KR | 1999-000640 | 1/1999 |

\* cited by examiner

F I G. 4
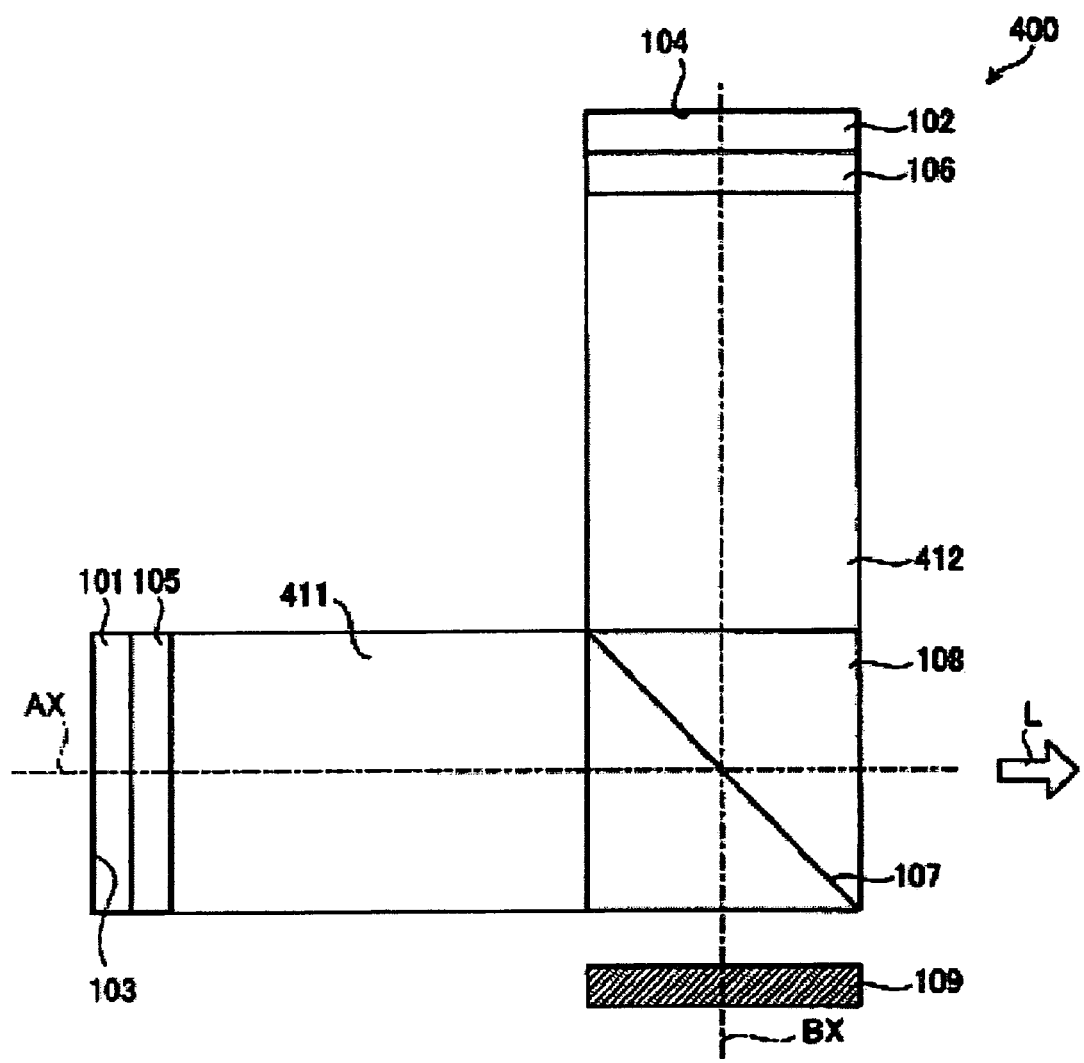

LIGHT SOURCE DEVICE AND IMAGE DISPLAY DEVICE

The present application claims priority to Japanese Patent Application No. 2004-348234 filed Dec. 1, 2004, which is hereby expressly incorporated by reference herein in its entirety.

BACKGROUND

1. Technical Field

The present invention relates to a light source device and an image display device, and particularly to technology of a light source device used in combination with a spatial light modulator.

2. Related Art

Recently, it has been proposed that a solid light emitting element is used in a light source device of a projector. A light emitting diode (hereinafter referred to as "LED") that is the solid light emitting element is characterized by being ultra small, ultra light, and long in life. Further, the LED for large output is in a remarkably advanced stage of development and improvement, so that application of the LED to use for illumination is enlarging. Therefore, it is expected that the LED is used as a light source of a projector, and particularly as a light source of a small-sized and bright projector. The more efficiently light from a light emitting part can be utilized, the brighter image can be obtained. Technology for utilizing efficiently the light from the light emitting part has been proposed in, for example, JP-A-2000-221499 and JP-A-2003-57445.

In the technologies proposed in JP-A-2000-221499 and JP-A-2003-57445, polarized light in a specified vibrating direction is supplied to a spatial light modulator. As the spatial light modulator which modulates the polarized light in the specified vibrating direction, there is a liquid crystal type spatial light modulator. A tilt mirror device used as the spatial light modulator of a projector except the liquid crystal type spatial light modulator modulates incident light regardless of a polarization state. Therefore, in the case that the tilt mirror device is used in place of the liquid crystal type spatial light modulator, it is thought that the constitution for polarization conversion is omitted from the constitution disclosed in JP-A-2000-221499 and JP-A-2003-57445.

In the case that the LED that is being developed is used in the projector, plural LED's must be used in order to obtain a bright image. In the case that plural LED's are used, according to the technologies in JP-A-2000-221499 and JP-A-2003-57445, the LED's are arranged in the shape of an array. In the case that the plural LED's are arranged in the shape of an array, the larger the number of the LED's is, the larger the region in which the LED's are arranged becomes. Further, in the projector, in an optical system including the light source device and the spatial light modulator, spatial extent in which luminous flux effectively handled exists can be expressed by the product of the area and the solid angle (Etendue, Geometrical Extent). This product of the area and the solid angle is stored in the optical system. From this point, it is thought that the use of the plural LED's increases the spatial extent of the luminous flux that is incident on the spatial light modulator.

On the other hand, a taking-in angle of the light which the spatial light modulator can effectively modulate has a limit. Therefore, the larger the spatial extent of the luminous flux which is incident on the spatial light modulator is, the more difficult it is to use the light from the light source device effectively. Therefore, even in the case that the technologies disclosed in JP-A-2000-221499 and JP-A-2003-57445 are used, there is a case in which the light cannot be efficiently utilized. Particularly, impossibility of the efficient utilization of the light from the light emitting part is a problem, because there is a case in which a bright image cannot be obtained even when plural light emitting parts are used.

SUMMARY

An advantage of some aspects of the invention is to provide a light source device which can reduce extent of luminous flux and supply the light with high efficiency, and an image display device which can display a bright image by use of its light source device.

According to an aspect of the invention, a light source device can be provided, which comprises at least two light emitting parts which supply light, and a polarization separating part which transmits polarized light in a first vibrating direction of the lights from the light emitting part, and reflects polarized light in a second vibrating direction nearly orthogonal to the first vibrating direction, thereby to separate the light from the light emitting part into the polarized light in the first vibrating direction and the polarized light in the second vibrating direction. Herein, the light emitting part includes a reflection part which reflects light that travels toward the light emitting part from the polarization separating part, in the direction of the polarization separating part. The polarization separating part synthesizes the polarized light in the first vibrating direction that has passed through the polarization separating part, and the polarized light in the second vibrating direction that has reflected on the polarization separating part, thereby to cause the synthesized light to travel in a predetermined direction.

The polarized light in the first vibrating direction, which has been incident on the polarization separating part from the light emitting part, passes through the polarization separating part. The polarized light in the second vibrating direction, which has been incident on the polarization separating part from the light emitting part, reflects on the polarization separating part. The polarization separating part synthesizes the polarized light in the first vibrating direction that passes through the polarization separating part and travels in the predetermined direction, and the polarized light in the second vibrating direction that reflects on the polarization separating part and travels in the predetermined direction. The light source device synthesizes the light from each light emitting part at the polarization separating part, whereby even in the case the plural light emitting parts are used, extent of the luminous flux emitted from the light source device can be reduced. Further, by providing the reflection part, the light that has traveled in the direction of the light emitting part reflects on the reflection part and travels in the direction of the polarization separating part. At this time, by using, for example, a phase plate to perform polarization conversion, the light that travels in the direction of the polarization separating part can be caused to travel in the predetermined direction. By such the transmission and the reflection at the polarization separating part, and the polarization conversion, it is possible to cause the light from the light emitting part to travel efficiently in the predetermined direction. Hereby, it is possible to obtain a light source device which can reduce the extent of the luminous flux and can supply the light with high efficiency.

It is preferable that the light source device includes a phase plate provided at least one point between the light emitting part and the polarization separating part. In the case that, for example, a λ/4 phase plate is used as the phase plate, the linearly polarized light that has been incident on the phase plate is converted into circularly polarized light by the phase plate. The light that has been converted into the circularly polarized light by the phase plate, for example, by reflecting on the reflection part and thereafter being incident on the phase plate again, is converted regarding the vibrating direction. By causing the light to pass through the λ/4 phase plate twice, the vibrating direction of the light can be turned at an angle of 90°. By causing the light to pass through the λ/4 phase plate twice, the polarized light in the first vibrating direction and the polarized light in the second vibrating direction can be mutually converted regarding the vibration direction. Hereby, light in another vibrating direction than the specified vibrating direction can be reused, so that the light from the light emitting part can be caused to travel efficiently in the predetermined direction.

Further, it is preferable that the light source device includes an optical element which is provided between the light emitting part and the polarization separating part, and leads the light from the light emitting part to the polarization separating part. Hereby, the light from the light emitting part can be led efficiently to the polarization separating part.

Further, it is preferable that the optical element is a rod integrator which nearly uniformizes the light from the light emitting part. By using the rod integrator, the light from the light emitting part can be efficiently led to the polarization separating part, and the light can be uniformized. Hereby, the light from the light emitting part can be efficiently led to the polarization separating part, and can be uniformized.

Further, it is preferable that the optical element is a collimator lens which nearly collimates the light from the light emitting part. By using the collimator lens, the light from the light emitting part can be efficiently led to the polarization separating part. Further, by using the collimator lens, the light that travels from the polarization separating part to the light emitting part travels on nearly the same optical path as the optical path when the light travels from the light emitting part to the polarization separating part. The light that travels from the polarization separating part to the light emitting part, by traveling on nearly the same optical path as the optical path when the light travels from the light emitting part to the polarization separating part, is efficiently incident on the light emitting part. Since the light that has been incident on the light emitting part reflects at the reflection part and travels in the direction of the polarization separating part again, the use of the collimator lens makes efficient reuse of the light possible. Hereby, the light from the light emitting part can be efficiently utilized.

Further, it is preferable that the optical element is a collective lens which collects the light from the light emitting part. By using the collective lens, the light from the light emitting part can be efficiently led to the polarization separating part. Further, in the case that the light from the light emitting part is brought into convergence, using the collective lens, it is not necessary to illuminate the polarization separating part telecentrically. Therefore, the degree of freedom in the constitution of the light source device can be heightened. Hereby, the high degree of freedom in the constitution can lead the light from the light emitting part to the polarization separating part efficiently.

Further, it is preferable that the light source device includes a mirror which reflects the light that has traveled from the polarization separating part in the direction different from the predetermined direction, in the direction of the polarization separating part. By using the mirror, it is possible to return the light that has traveled in the direction different from the direction of a predetermined illumination target, in the direction of the polarization separating part. Hereby, the light that has traveled in another direction than the predetermined direction can be reused, so that the light from the light emitting part can be efficiently utilized.

Further, it is preferable that: the light source device includes at least a first light emitting part and a second light emitting part; the first light emitting part is provided in such a position that the polarized light in the first vibrating direction that has been incident on the polarization separating part from the first light emitting part travels in the predetermined direction after passing through the polarization separating part; and the second light emitting part is provided in such a position that the polarized light in the second vibrating direction that has been incident on the polarization separating part from the second light emitting part travels in the predetermined direction after reflecting on the polarization separating part. Hereby, the polarized light in the first vibrating direction from the first light emitting part, and the polarized light in the second vibrating direction from the second light emitting part can be synthesized, and the synthesized light can be caused to travel in the predetermined direction.

Further, it is preferable that: the light source device includes further a third light emitting part; and the third light emitting part is provided in such a position that the polarized light in the first vibrating direction that has been incident on the polarization separating part from the third light emitting part travels in the direction of the second light emitting part after passing through the polarization separating part, and the polarized light in the second vibrating direction that has been incident on the polarization separating part from the third light emitting part travels in the direction of the first light emitting part after reflecting on the polarization separating part.

The polarized light in the first vibrating direction that has been incident on the polarization separating part from the third light emitting part travels in the direction of the second light emitting part after passing through the polarization separating part. The light that has traveled in the direction of the second light emitting part reflects at the reflection part and travels in the direction of the polarization separating part. The polarized light in the second vibrating direction that has been incident on the polarization separating part from the third light emitting part travels in the direction of the first light emitting part after reflecting on the polarization separating part. The light that has traveled in the direction of the first light emitting part reflects at the reflection part and travels in the direction of the polarization separating part. The light from the third light emitting part, by transmission and reflection at the polarization separating part, and polarization conversion, travels in the predetermined direction. Hereby, the light from the third light emitting part can be caused to travel in the predetermined direction, and brighter illumination light can be supplied.

Further, it is preferable that: the light source device includes a first polarization separating part and a second polarization separating part; the first polarization separating part synthesizes the lights from the light emitting parts provided correspondingly to the first polarization separating part and causes the synthesized light to travel in the direction of the second polarization separating part; and the second polarization separating part synthesizes the light from the first polarization separating part and the lights from the light emitting parts provided correspondingly to the second polarization separating part and causes the synthesized light to travel in the predetermined direction. By providing respectively the light emitting parts correspondingly to the first polarization separating part and the second polarization separating part, more light emitting parts can be arranged than those in the case of using the sole polarization separating part. Further, by synthesizing the light from the first polarization separating part and the lights from the light emitting parts provided correspondingly to the second polarization separating part, extent of the luminous flux can be reduced. Hereby, the extent of the luminous flux can be reduced, and brighter illumination light can be obtained.

Further, according to another aspect of the invention, it is possible to provide an image display device which includes the above light source device, and a spatial light modulator which modulates the light from the light source device according to image signals. By providing the above light source device, the light can be supplied with high efficiency to the spatial light modulator that is an object of illumination. Hereby, it is possible to obtain an image display device which can display a bright image with high efficiency of light utilization.

BRIEF DESCRIPTION OF THE DRAWINGS

The invention will be described with reference to the accompanying drawings, wherein like numbers reference like elements.

FIG. 4 is a constitutional diagram of a light source device which uses a rod integrator.

DESCRIPTION OF EXEMPLARY EMBODIMENTS

Referring to drawings, embodiments of the invention will be described in detail.

Embodiment 1

Figure 1:
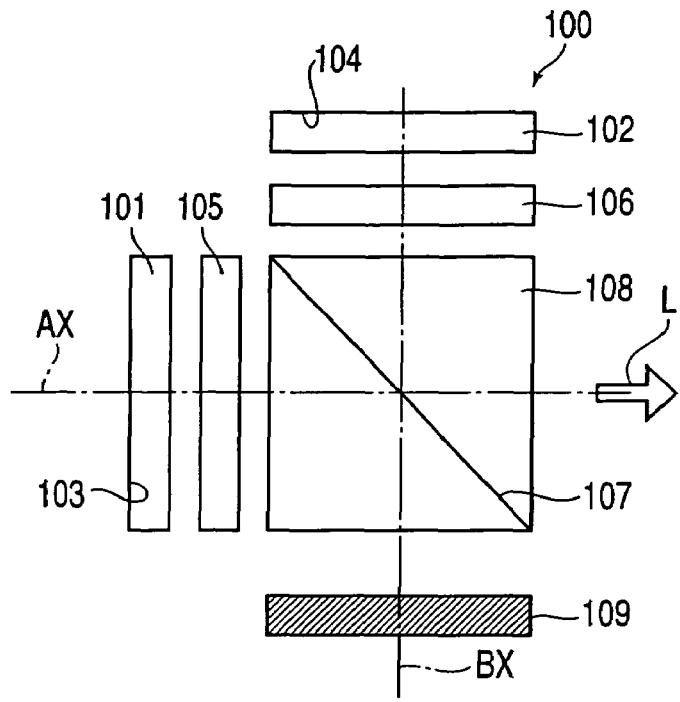
FIG. 1 is a schematic constitutional diagram of a light source device according to a first embodiment of the invention.

FIG. 1 shows the schematic constitution of a light source device 100 according to a first embodiment of the invention. The light source device 100 includes a LED 101 that is a first light emitting part, and a LED 102 that is a second light emitting part. The LED's 101 and 102 are surface-emitting light sources which emit light mainly from a surface of a chip. The LED's 101 and 102 supply the light in the direction of a polarization beam splitter 108. The polarization beam splitter 108 is a structure having the shape of rectangular solid, which is formed by laminating two prisms. Between the two prisms of the polarization beam splitter 108, a polarization film 107 is formed.

The polarization film 107 is a polarization separating part, which transmits polarized light in a first vibrating direction of the lights from the LED's 101 and 102, and reflects polarized light in a second vibrating direction, thereby to separate the lights from the LED's 101 and 102 into the polarized light in the first vibrating direction and the polarized light in the second vibrating direction. The polarized light in the first vibrating direction is, for example, p-polarized light. The polarized light in the second vibrating direction is polarized light in a vibrating direction nearly orthogonal to the first vibrating direction, for example, s-polarized light.

Between the LED 101 and the polarization beam splitter 108, and between the LED 102 and the polarization beam splitter 108, $\lambda/4$ phase plates 105 and 106 that are phase plates are respectively provided. The LED 101 and the $\lambda/4$ phase plate 105 are arranged correspondingly on a surface opposite to an output surface of the polarization beam splitter 108. The LED 102 and the $\lambda/4$ phase plate 106 are arranged correspondingly on a surface adjacent to the output surface of the polarization beam splitter 108.

On an opposite side to the side on which the LED 102 is provided, of the polarization beam splitter 108, a mirror 109 is provided. The mirror 109 reflects, in the direction of the polarization beam splitter 108, the light that has passed through the polarization film 107 and traveled from the polarization film 107 in the direction different from the predetermined illuminating direction L. Further, the LED's 101 and 102 have respectively a reflection part 103, 104. The reflection parts 103 and 104 are metallic electrodes formed of a highly reflective metallic member. The reflection part 103 reflects in the direction of the polarization film 107 the light that travels from polarization film 107 in the direction of the LED 101. The reflection part 104 reflects in the direction of the polarization film 107 the light that travels from polarization film 107 in the direction of the LED 102.

The LED 101 is arranged with an optical axis AX along the illuminating direction L as a center. The LED 102 and the mirror 109 are arranged with an axis BX nearly perpendicular to the optical axis AX as a center. The polarization beam splitter 108 is arranged so that the polarization film 107 tilts at an angle of about 45° to both of the optical axis AX and the axis BX. Further, the polarization beam splitter 108 is provided so that the optical axis AX and the axis BX intersect nearly in the center of the polarization film 107.

The LED 101 and the LED 102 supply the light including the p-polarized light and the s-polarized light. The light from the LED 101 passes through the $\lambda/4$ phase plate 105 and thereafter is incident on the polarization beam splitter 108. Of the lights that have passed through the $\lambda/4$ phase plate 105 and been incident on the polarization beam splitter 108, the p-polarized light passes through the polarization film 107 and thereafter travels in the predetermined illuminating direction L shown by an arrow. On the other hand, of the lights that have passed through the $\lambda/4$ phase plate 105 and being incident on the polarization beam splitter 108, the s-polarized light reflects on the polarization film 107 and thereafter travels in the direction of the mirror 109.

The s-polarized light that has traveled in the direction of the mirror 109 reflects on the mirror 109, and thereafter travels again in the direction of the polarization beam splitter 108. The s-polarized light that has traveled in the direction of the polarization beam splitter 108 reflects on the polarization film 107 and travels in the direction of the LED 101. The s-polarized light that has traveled in the direction of the LED 101 passes through the λ/4 phase plate 105 thereby to be converted into circularly polarized light. The circularly polarized light that has been incident on the LED 101 reflects on the reflection part 103, and thereafter is incident again on the λ/4 phase plate 105. The λ/4 phase plate 105 converts circularly polarized light into p-polarized light and causes the converted light to be incident on the polarization beam splitter 108. By thus causing the light to pass through the λ/4 phase plate 105 twice, the vibrating direction of the light can be turned at an angle of 90°. The p-polarized light that has been incident on the polarization beam splitter 108 passes through the polarization film 107 and travels in the illuminating direction L. The s-polarized light from the LED 101 is outputted, through one reflection at the reflection part 103, two reflections at the polarization film 107, one reflection at the mirror 109, and one transmission at the polarization film 107, from the light source device 100.

The light from the LED 102 passes through the λ/4 phase plate 106 and thereafter is incident on the polarization beam splitter 108. Of the lights that have passed through the λ/4 phase plate 106 and been incident on the polarization beam splitter 108, the s-polarized light reflects on the polarization film 107 and travels in the illuminating direction L. On the other hand, of the lights that have passed through the λ/4 phase plate 106 and been incident on the polarization beam splitter 108, the p-polarized light passes through the polarization film 107 and thereafter travels in the direction of the mirror 109. The p-polarized light that has traveled in the direction of the mirror 109 reflects on the mirror 109, and is incident again on the polarization beam splitter 108. The p-polarized light that has been incident on the polarization beam splitter 108 passes through the polarization film 107 and travels in the direction of the LED 102.

The p-polarized light that has traveled in the direction of the LED 102, till reflects on the reflection part 104 and is incident on the polarization beam splitter 108, passes through the λ/4 phase plate 106 twice, whereby the p-polarized light is converted into s-polarized light. The s-polarized light that has been incident on the polarization beam splitter 108 reflects on the reflection part 107, and travels in the direction of the illuminating direction L. The p-polarized light from the LED 102 is outputted, through one reflection at the reflection part 104, one reflection at the polarization film 107, one reflection at the mirror 109, and two transmissions at the polarization film 107, from the light source device 100. As described above, the polarization film 107 that is the polarization separating part synthesizes the p-polarized light that has passed through the polarization film 107, and the s-polarized light that has reflected on the polarization film 107 thereby to cause the synthesized light to travel in the illuminating direction L.

It is assumed that: reflectance at the reflection part 103, 104, and reflectance at the polarization film 107, and reflectance at the mirror 109 are respectively 60%, 90%, and 85%; and transmittance of the polarization film 107 is 90%. Assuming that intensity of the illumination light in the case that the p-polarized light is, for the purpose of illumination, taken out from one LED as it is, is 0.5, the total power of the illumination lights emitted from the light source device 100 in this embodiment is about 1.272. Utilization efficiency of the emission light from the LED 101, 102 is about 63.6% per LED. Further, based on the light source device which takes out, for the purpose of illumination, the P-polarized light from one LED, the light source device 100 in this embodiment can supply the illumination light having intensity by about 2.54 times.

The light source device 100, by synthesizing the lights from the LED's 101 and 102 at the polarization film 107, causes the respective lights from the LED's 101 and 102 to travel to nearly the same illumination area. Therefore, even in the case that the plural light emitting parts are used, the extent of the luminous flux outputted from the light source device 100 can be reduced. Further, by providing the reflection parts 103 and 104, the lights that have traveled in the directions of the LED's 101 and 102 reflect on the reflection parts 103 and 104 thereby to travel in the direction of the polarization film 107. At this time, by performing polarization conversion by use of the λ/4 phase plates 105 and 106, the lights traveling in the direction of the polarization film 107 can be caused to travel in the illuminating direction L.

Thus, by the transmission and reflection at the polarization film 107, and the polarization conversion, the lights from the LED's 101 and 102 can be caused to travel in the illuminating direction L efficiently. Hereby, an advantage that the extent of the luminous flux can be reduced, and the light can be supplied with high efficiency can be obtained. In the case that the light source device 100 is used in, for example, a projector, the extent of luminous flux that is incident on a spatial light modulator can be reduced. Therefore, the illumination light from the light source device 100 can be efficiently modulated by the spatial light modulator.

The polarization film 107 may transmit the s-polarized light and may reflect the p-polarized light. In this case, the polarization film 107 synthesizes the s-polarized light that has passed through the polarization film 107, and the p-polarized light that has reflected on the polarization film 107 thereby to cause the synthesized light to travel in the illuminating direction L. Further, the polarization separating part does not always use the polarization film 107, but may use a wire grid type polarization plate. In the case that the wire grid type polarization plate is used in place of the polarization film 107, the price of the light source device 100 can be made low. The wire grid type polarization plate will be described later.

Figure 2:
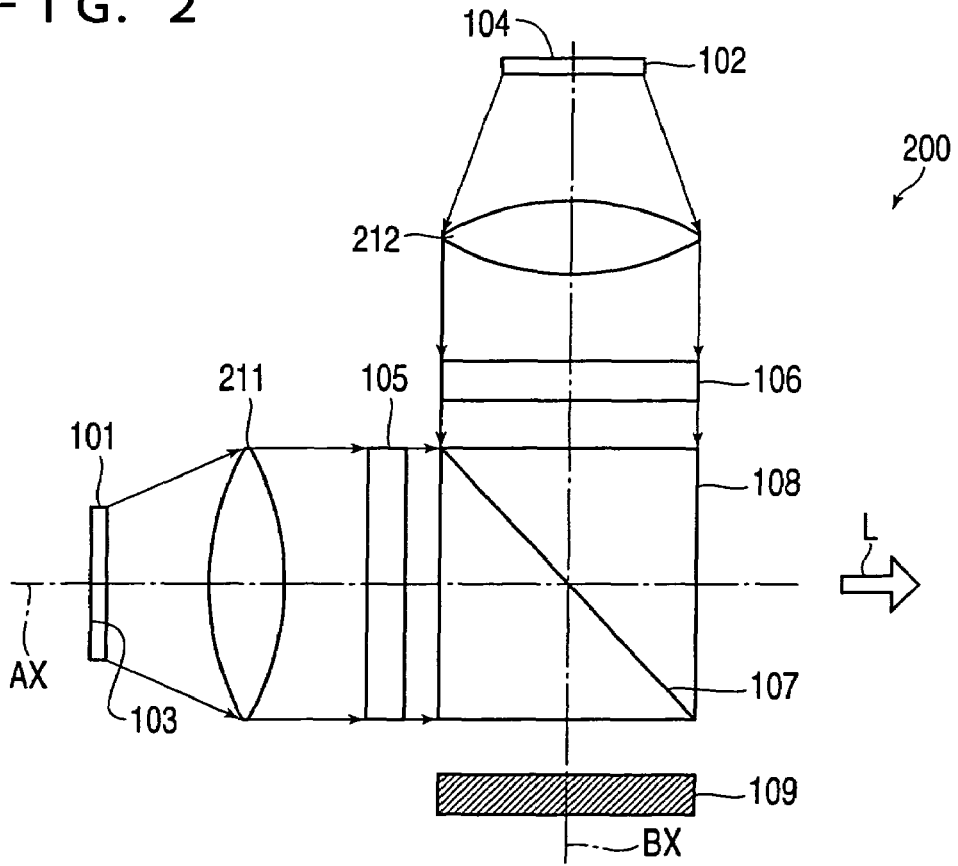
FIG. 2 is a constitutional diagram of a light source device which uses a collimator lens.

FIG. 2 shows a modified example of the light source device 100, in which the constitution of a light source device 200 using collimator lenses 211 and 212 is shown. In this aspect and aspects which will be described later, the same parts as those in the light source device 100 are denoted by the same reference numerals, and the overlapping description is omitted. The collimator lens 211 is provided in an optical path between a LED 101 that is a first light emitting part and a λ/4 phase plate 105. The collimator lens 212 is provided in an optical path between a LED 102 that is a second light emitting part and a λ/4 phase plate 106.

The collimator lenses 211 and 212 are optical elements which lead respectively lights from the LED's 101 and 102 to a polarization film 107. Further, the collimator lenses 211 and 212 nearly collimate the lights from the LED's 101 and 102 respectively. The collimator lens 211 nearly collimates a principal ray of the light outputted from the collimator lens 211 in relation to an optical axis AX, and illuminates telecentrically the polarization film 107. The collimator lens 212 nearly collimates a principal ray of the light outputted from the collimator lens 212 in relation to an axis BX, and illuminates telecentrically the polarization film 107. By the collimator lenses 211 and 212, the lights from the LED's 101 and 102 can be efficiently led to the polarization film 107.

Figure 3:
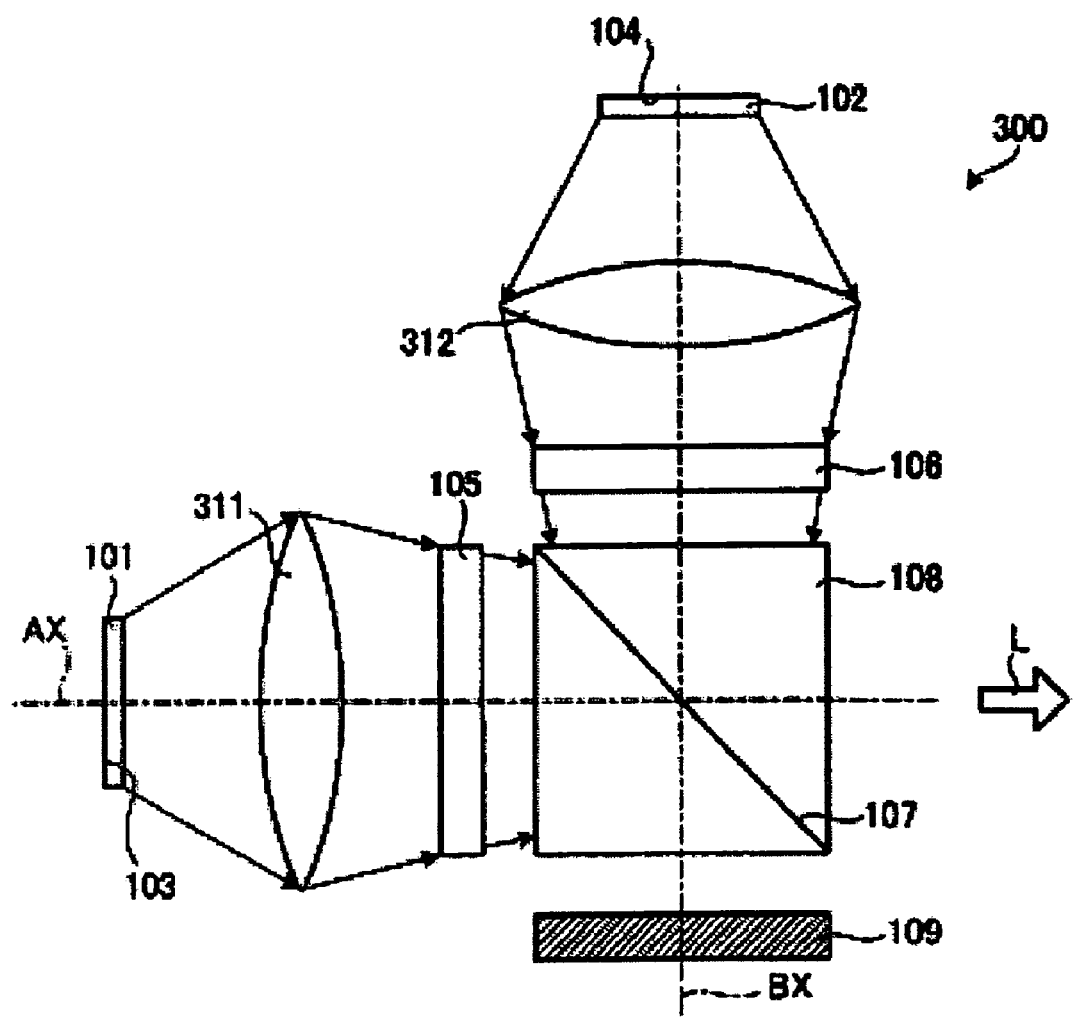
FIG. 3 is a constitutional diagram of a light source device which uses a collective lens.

FIG. 3 shows the constitution of a light source device 300 using collective lenses 311 and 312 as an optical element. The collective lens 311 is provided in an optical path between a LED 101 and a λ/4 phase plate 105. The collective lens 312 is provided in an optical path between a LED 102 and a λ/4 phase plate 106. The collective lenses 311 and 312 collect respectively the lights from the LED's 101 and 102. By the collective lenses 311 and 312, the lights from the LED's 101 and 102 can be efficiently led to a polarization film 107.

Further, in the case that the lights from the LED's 101 and 102 are brought into convergence by use of the collective lenses 311 and 312, it is not necessary to illuminate the polarization film 107 telecentrically. Therefore, it is possible to heighten the degree of freedom in the constitution of the light source device 300. By using the collective lenses 311 and 312, under the constitution of the high degree of freedom, the lights from the LED's 101 and 102 can be efficiently led to a polarization film 107.

FIG. 4 shows the constitution of a light source device 400 using rod integrators 411 and 412 as an optical element. The rod integrator 411 is provided in an optical path between a LED 101 and a λ/4 phase plate 105. The rod integrator 412 is provided in an optical path between a LED 102 and a λ/4 phase plate 106. The rod integrator 411, 412 is made of a transparent glass member having the shape of a rectangular solid. The lights that have been incident on the rod integrators 411 and 412, while repeating total reflection on an interface between the glass member and air, travel in the rod integrators 411 and 412.

The constitutional member of the rod integrator 411, 412 is not limited to the glass member, but may use what has hollow structure in which an inner surface is composed of a reflection surface. In the case of a rod integrator in which an inner surface is composed of a reflection surface, the light that has been incident on the rod integrator, while repeating reflection on the reflection surface, travels in the rod integrator. Further, the rod integrator may be constituted by combination of the glass member and the reflection surface.

By using the rod integrators 411 and 412, the lights from the LED's 101 and 102 can be efficiently led to a polarization film 107. Further, the rod integrators 411 and 412 nearly uniformize intensity distributions of the lights from the LED's 101 and 102, respectively. By using the rod integrators 411 and 412, the lights from the LED's 101 and 102 can be efficiently and uniformly led to a polarization film 107. The light source device 400 does not always have such a constitution that both of the LED, the λ/4 phase plate, the rod integrator, and the polarization beam splitter are joined, but may have such a constitution that they are spaced.

Further, the optical element is not always provided between the LED 101, 102 and the λ/4 phase plate 105, 106, but may be provided between the λ/4 phase plate 105, 106 and the polarization beam splitter 108. Further, the light source device may use the optical elements described with reference to FIGS. 2 to 4 in combination, and further may use another optical element in combination with their optical elements.

Figure 5:
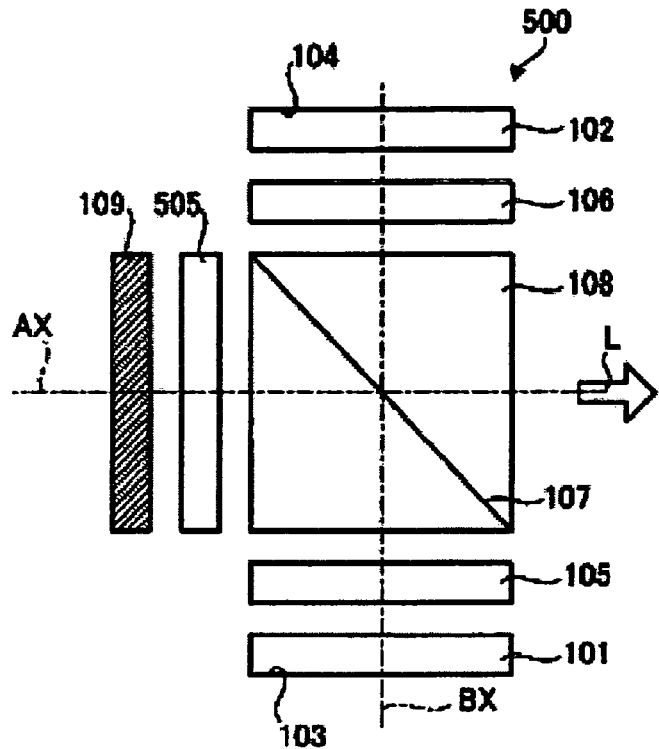
FIG. 5 is a diagram for explaining a modified example of the light source device.

FIG. 5 shows the constitution of a light source device 500 according to a modified example of this embodiment. In the light source device 500, under the constitution of the above light source device 100, arrangements of the LED 101 and the mirror 109 are exchanged for each other. Like the light source device 500, on the basis of the constitution of the light source device 100, the arrangements of the LED 101,102 and the mirror 109 may be appropriately changed. Further, in the light source device 500, between the mirror 109 and the polarization beam splitter 108, a λ/4 phase plate 505 is provided. Thus, the λ/4 phase plate is not always provided between the LED 101, 102 and the polarization beam splitter 108, but may be provided between the mirror 109 and the polarization beam splitter 108.

Embodiment 2

Figure 6:
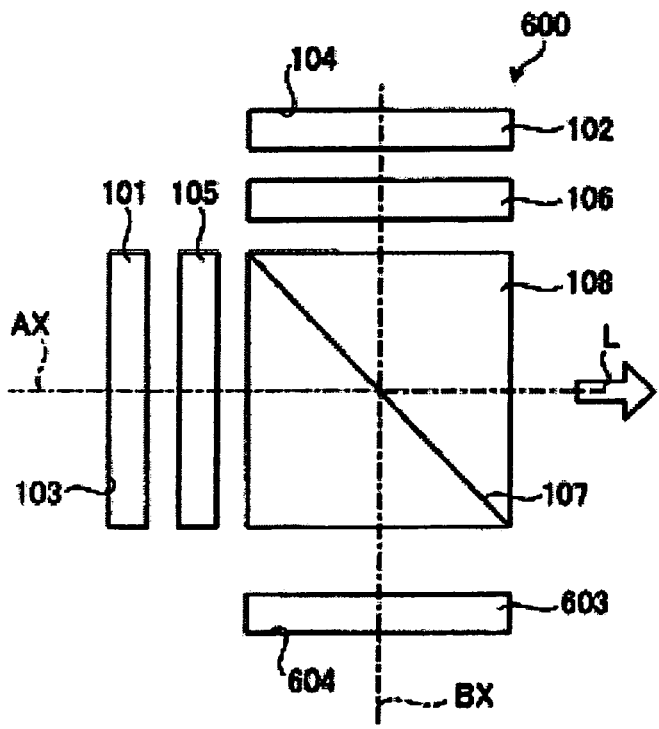
FIG. 6 is a schematic constitutional diagram of a light source device according to a second embodiment of the invention.

FIG. 6 shows the schematic constitution of a light source device 600 according to a second embodiment of the invention. The light source device 600 is characterized by including, in addition to a LED 101 that is a first light emitting part and a LED 102 that is a second light emitting part, a LED 603 that is a third light emitting part. The LED 603 is provided on the opposite side to the side where the LED 102 is provided, of a polarization beam splitter 108. The LED 603, similarly to the LED 102, is arranged with an axis BX as a center. The LED 603 includes a reflection part 604 that is a metallic electrode. Further, between the LED 603 and the polarization beam splitter 108, a λ/4 phase plate is not provided.

The LED 603 supplies light including p-polarized light and s-polarized light. Of the lights that have been incident on the polarization beam splitter 108 from the LED 603, the p-polarized light passes through a polarization film 107, and thereafter travels in the direction of the LED 102. The p-polarized light that has traveled in the direction of the LED 102, till reflects on a reflection part 104 and is incident on the polarization beam splitter 108, passes through a λ/4 phase plate 106 twice, whereby the p-polarized light is converted into s-polarized light. The s-polarized light that has been incident on the polarization beam splitter 108 reflects on the polarization film 107, and travels in an illuminating direction L.

Of the lights that have been incident on the polarization beam splitter 108 from the LED 603, the s-polarized light reflects on the polarization film 107, and thereafter travels in the direction of the LED 101. The s-polarized light that has traveled in the direction of the LED 101, till reflects on a reflection part 103 and is incident on the polarization beam splitter 108, passes through a λ/4 phase plate 105 twice, whereby the s-polarized light is converted into p-polarized light. The p-polarized light that has been incident on the polarization beam splitter 108 passes through the polarization film 107, and travels in the illuminating direction L.

Assuming that intensity of the illumination light in the case that the p-polarized light is, for the purpose of illumination, taken out from one LED as it is, is 0.5, the total power of the illumination lights emitted from the light source device 600 in this embodiment is about 1.648. Utilization efficiency of the emission light from the LED 101, 102, 603 is about 54.9% per LED. Further, based on the light source device which takes out, for the purpose of illumination, the p-polarized light from one LED, the light source device 600 in this embodiment can supply the illumination light having intensity by about 3.30 times. Further, reflectance of the reflection part 604 is 60% which is the same as that of each of the reflection parts 103 and 104. According to the embodiment, the light from the LED 603 that is the third light emitting part can also be caused to travel in the illuminating direction L. Hereby, brighter illumination light can be supplied.

Figure 7:
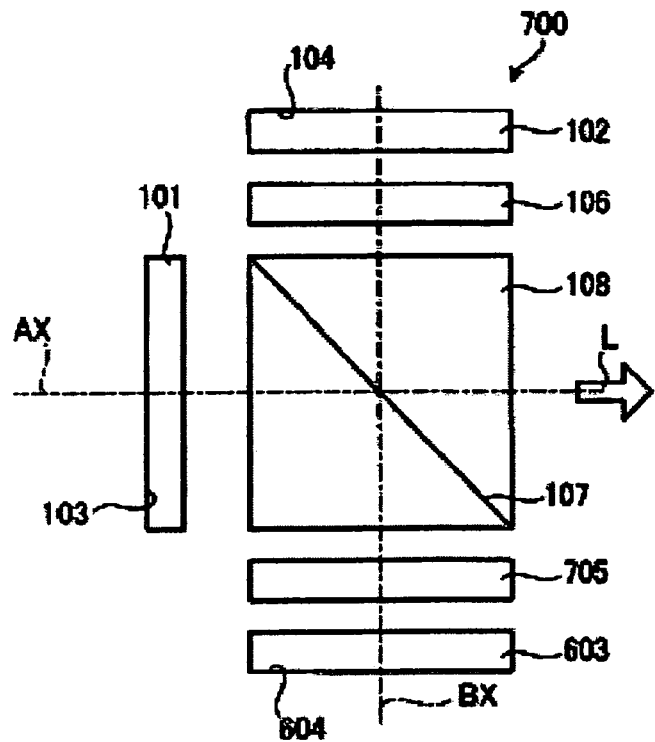
FIG. 7 is a diagram for explaining a modified example of the light source device.

FIG. 7 shows the constitution of a light source device 700 according to a modified example of the embodiment. In the light source device 700, between a LED 603 that is a third light emitting part and a polarization beam splitter 108, a λ/4 phase plate 705 is provided. Further, between a LED 101 that is a first light emitting part and the polarization beam splitter 108, the λ/4 phase plate is not provided. The λ/4 phase plate should be provided in at least a point between the LED and the polarization film, and the arrangement position of the λ/4 phase plate can be appropriately changed. Further, the λ/4 phase plate may not be provided in any point between each of the LED's 101, 102 603, and the polarization beam splitter 108.

Embodiment 3

Figure 8:
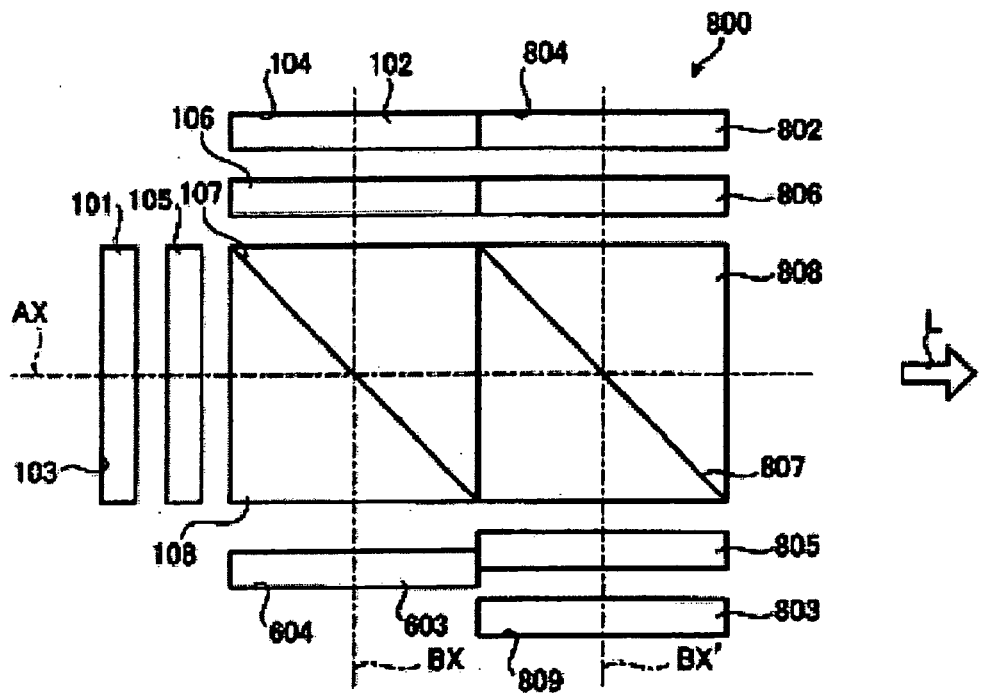
FIG. 8 is a schematic constitutional diagram of a light source device according to a third embodiment of the invention.

FIG. 8 shows the schematic constitution of a light source device 800 according to a third embodiment. The light source device 800 is characterized by including a polarization beam splitter 108 having a polarization film 107 that is a first polarization separating part, and a polarization beam splitter 808 having a polarization film 807 that is a second polarization separating part. The polarization film 107 transmits p-polarized light, and reflects s-polarized light, while the polarization film 807 transmits the s-polarized light that is polarization light in the second vibrating direction, and reflects the p-polarized light that is polarization light in the first vibrating direction.

LED's 101, 102 and 603 are provided, correspondingly to the polarization beam splitter 108, around the polarization beam splitter 108. The constitution around the polarization beam splitter 108 is similar to that of the light source device 600 shown in FIG. 6. In the constitution of the light source device 800, the polarization beam splitter 808 is added to the constitution of the light source device 600.

The polarization beam splitter 808 is provided on the output side of the polarization beam splitter 108. Similarly to that the LED's 102 and 603 are provided correspondingly to the polarization beam splitter 108, LED's 802 and 803 are provided correspondingly to the polarization beam splitter 808. The LED's 802 and 803 have respectively reflection parts 804 and 809 that are metallic electrodes. Between the LED 802 and the polarization beam splitter 108, and between the LED 803 and the polarization beam splitter 108, λ/4 phase plates 806 and 805 that are phase plates are respectively provided.

The LED's 802 and 803 are arranged with an axis BX' nearly perpendicular to an optical axis AX as a center. The polarization beam splitter 808 is arranged so that the polarization film 807 tilts at an angle of about 45° to both of the optical axis AX and the axis BX'. Further, the polarization beam splitter 808 is provided so that the optical axis AX and the axis BX' intersect nearly in the center of the polarization film 807.

The polarization film 107 that is the first polarization separating part synthesizes lights from the LED's 102, 103 and 603 that are provided correspondingly to the polarization beam splitter 108, and causes the synthesized light to travel in the direction of the polarization film 807 that is the second polarization separating part. On the polarization beam splitter 808, the p-polarized light and the s-polarized light from the polarization beam splitter 108 are incident. The s-polarized light from the polarization beam splitter 108 passes through the polarization film 807, and thereafter travels in the direction of a predetermined illuminating direction L shown by an arrow. The p-polarized light from the polarization beam splitter 108 reflects on the polarization film 807, and thereafter travels in the direction of the LED 803. The p-polarized light that has traveled in the direction of the LED 803, till reflects on the reflection part 809 and thereafter is incident on the polarization beam splitter 808, passes through the λ/4 phase plate 805 twice, whereby the p-polarized light is converted into s-polarized light.

The s-polarized light that has been incident on the polarization beam splitter 808 passes through the polarization film 807, and travels in the direction of the LED 802. The s-polarized light that has traveled in the direction of the LED 802, till reflects on the reflection part 804 and is incident on the polarization beam splitter 808, passes through the λ/4 phase plate 806 twice, whereby the s-polarized light is converted into p-polarized light. The p-polarized light that has been incident on the polarization beam splitter 808 reflects on the polarization film 807, and travels in the illuminating direction L.

The LED's 802 and 803 supply the light including the p-polarized light and the s-polarized light. The light from the LED 803 passes through the λ/4 phase plate 805, and thereafter is incident on the polarization beam splitter 808. Of lights that have passed through the λ/4 phase plate 805 and been incident on the polarization beam splitter 808, the s-polarized light passes through the polarization film 807 and travels in the direction of the LED 802. The s-polarized light that has traveled in the direction of the LED 802, till reflects on the reflection part 804 and is incident on the polarization beam splitter 808, passes through the λ/4 phase plate 806 twice, whereby the s-polarized light is converted into p-polarized light. The p-polarized light that has been incident on the polarization beam splitter 808 reflects on the reflection part 807, and travels in the illuminating direction L. The s-polarized light from the LED 803, through one reflection at the polarization part, one reflection at the polarization film, and one transmission at the polarization film, outputs from the light source device 800.

Of the lights that have passed through the λ/4 phase plate 805 and been incident on the polarization beam splitter 808, the p-polarized light reflects on the reflection film 807, and travels in the direction of the polarization beam splitter 108. The p-polarized light that has been incident on the polarization beam splitter 108 passes through the polarization film 107, and travels in the direction of the LED 101. The p-polarized light that has traveled in the direction of the LED 101, till reflects on a reflection part 103 and is incident on the polarization beam splitter 108, passes through a λ/4 phase plate 105 twice, whereby the p-polarized light is converted into s-polarized light. The s-polarized light that has been incident on the polarization beam splitter 108 acts similarly to the s-polarized light from the LED 101. The p-polarized light from the LED 803, through five reflections at the reflection parts, five reflections at the polarization films, and three transmissions at the polarization films, outputs from the light source device 800.

The light from the LED 802 passes through the λ/4 phase plate 806, and thereafter is incident on the polarization beam splitter 806. Of the lights that have passed through the λ/4 phase plate 806 and thereafter been incident on the polarization beam splitter 808, the p-polarized light reflects on the reflection film 807, and travels in the illuminating direction L. Of the lights that have passed through the λ/4 phase plate 806 and been incident on the polarization beam splitter 808, the s-polarized light passes through the polarization film 807, and travels in the direction of the LED 803. The s-polarized light that has traveled in the direction of the LED 803, till reflects on a reflection part 809 and is incident again on the polarization beam splitter 808, passes through the λ/4 phase plate 805 twice, whereby the s-polarized light is converted into p-polarized light. The p-polarized light that has been incident on the polarization beam splitter 808 acts similarly to the p-polarized light from the LED 803. The s-polarized light from the LED 802, through six reflections at the reflection parts, five reflections at the polarization films, and four transmissions at the polarization films, outputs from the light source device 800. As described above, the polarization film 807 that is the second polarization separating part synthesizes the light from the polarization film 107 that is the first polarization separating part, and the lights from the LED's 802 and 803 that are the light emitting parts provided correspondingly to the polarization beam splitter 808, and causes the synthesized light to travel in the illuminating direction L.

Assuming that intensity of the illumination light in the case that the p-polarized light is, for the purpose of illumination, taken out from one LED as it is, is 0.5, the total power of the illumination lights emitted from the light source device 800 in this embodiment is about 1.690. Utilization efficiency of the emission light from each LED is about 33.8% per LED. Further, based on the light source device which takes out, for the purpose of illumination, the p-polarized light from one LED, the light source device 800 in this embodiment can supply the illumination light having intensity by about 3.38 times. Further, reflectance of the reflection part 804, 809 is 60% which is the same as that of the reflection part 103, 104, 603. Further, both reflectance and transmittance of polarization film 807 are 90%, which are the same as those of the polarization film 107.

By providing the LED's correspondingly to each polarization beam splitter 108, 808, more LED's can arranged than the LED's in the case that the sole polarization beam splitter is used. Further, by synthesizing the light from the polarization film 107 that is the first polarization separating member, and the lights from the LED's 802 and 803 which are provided correspondingly to the polarization film 807, the extent of the luminous flux can be reduced. Hereby, an advantage that the extent of the luminous flux can be reduced, and brighter illumination light can be obtained is obtained.

Figure 9:
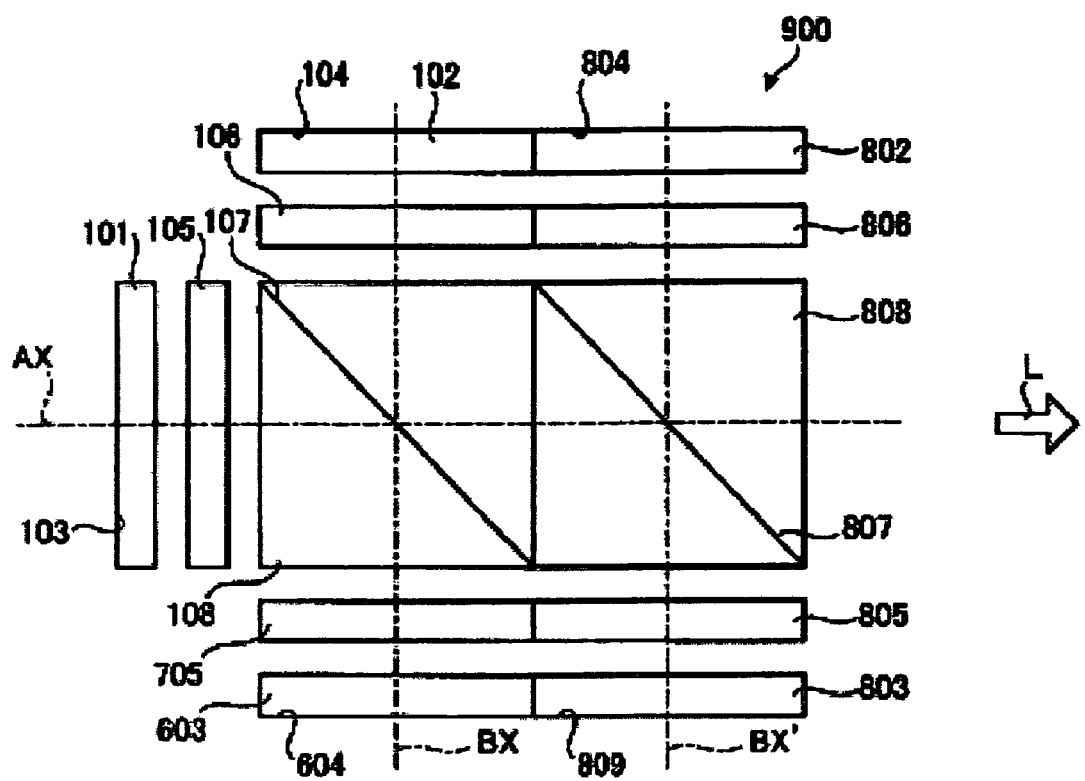
FIG. 9 is a diagram for explaining a modified example of the light source device.

FIG. 9 shows the constitution of a light source device 900 according to a modified example of the embodiment. In the light source device 900, in addition to the constitution of the light source device 800, between the LED 603 and the polarization beam splitter 108, a $\lambda/4$ phase plate 705 is provided. By providing the $\lambda/4$ phase plate 705, the number of reflections at the polarization film 107 and the reflection parts till the s-polarized light that travels from the LED 101 to the polarization beam splitter 108 outputs from the light source device 900 is reduced. Therefore, it is possible to reduce attenuation of the intensity of the s-polarized light that travels from the LED 101 to the polarization beam splitter 108. The total power of the illumination lights emitted from the light source device 900 is about 1.739 that is larger than the total power of the illumination lights emitted from the light source device 800. Further, utilization efficiency of the emission light from each LED is about 34.8% per LED. Further, compared with the light source device in which the intensity of the illumination light is 0.5, the light source device 900 can supply the illumination light having the intensity of by 3.48 times.

Further, in the light source device in this embodiment, on the output side of the polarization beam splitter 808, another polarization beam splitter can be further provided. By further providing more polarization beam splitters, more LED's can be arranged. Further, even in the case that the number of the LED's increases, the size of space in which the luminous flux outputted from the light source device exists is nearly the same. Therefore, the extent of the luminous flux can be reduced. Further, the light source devices in this embodiment and the second embodiment may be provided with an optical element similarly to the light source device in the first embodiment.

Embodiment 4

Figure 10:
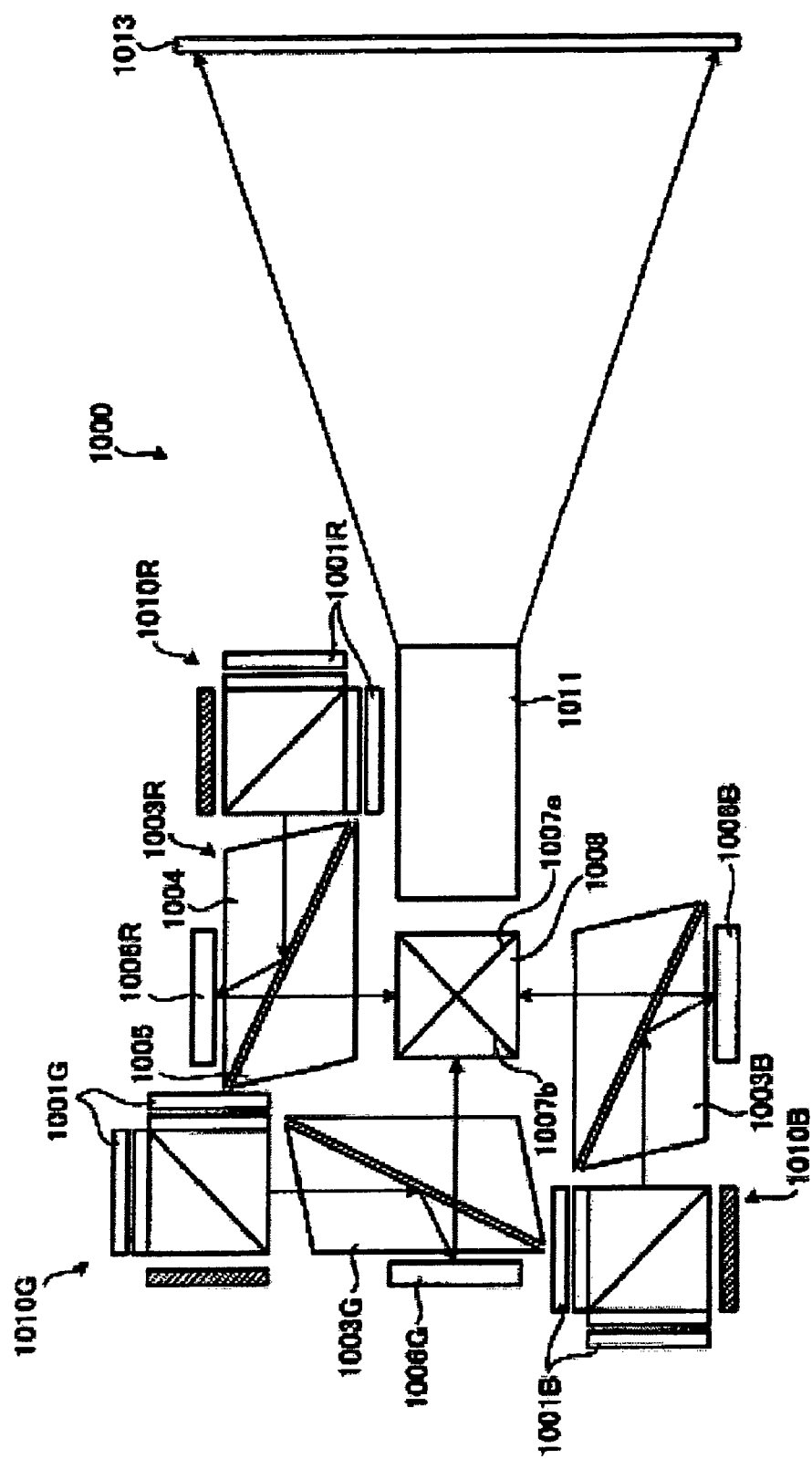
FIG. 10 is a schematic constitutional diagram of a projector according to a fourth embodiment of the invention.

FIG. 10 shows the schematic constitution of a projector 1000 that is an image display device according to a fourth embodiment of the invention. The projector 1000 includes three spatial light modulators 1006R, 1006G, and 1006B, that is, it is a three-panel type projector. The projector 1000 includes an R-light source device 1010R, a G-light source device 1010G, and a B-light source device 1100B. Each of the light source devices 1010R, 1010G, and 1010B has the constitution similar to that of the light source device 100 in the first embodiment.

The R-light source device 1010R includes two R-light LED's 1001R. The R-light LED 1001R supplies R-light. The R-light source device 1010R causes the R-light from the R-light LED 1001R to travel in the direction of a TIR (total reflection) prism 1003R that is a predetermined direction. In the TIR prism 1003R, two prisms 1004 and 1005 are laminated through an air layer. The TIR prism 1003R is arranged so that the R-light which has been incident on the prism 1004 reflects totally on an interface between the prism 1004 and air and travels in the direction of the spatial light modulator 1006R. Further, the TIR prism 1003R is arranged so that the light modulated by the spatial light modulator 1006R passes through the interface between the prism 1004 and air, and through the prism 1005.

The spatial light modulator 1006R is a tilt mirror device which modulates the R-light from the R-light source device 1010R according to an image signal. As an example of the tilt mirror device, there is DMD (registered trademark) by TEXAS INSTRUMENTS. The spatial light modulator 1006R modulates the R-light regardless of the polarization state. The light modulated by the spatial light modulator 1006R passes through the TIR prism 1003R and is incident on a cross dichroic prism 1008.

The G-light source device 1010G includes two G-light LED's 1001G The G-light LED 1001G supplies G-light. The G-light source device 1010G causes the G-light from the G-light LED 1001G to travel in the direction of the TIR prism 1003G that is the predetermined direction. The TIR prism 1003G causes the G-light from the G-light source device 1010G to travel in the direction of the spatial light modulator 1006G. The spatial light modulator 1006G is a tilt mirror device which modulates the G-light from the G-light source device 1010G according to an image signal. The light modulated by the spatial light modulator 1006G passes through the TIR prism 1003G and is incident on the cross dichroic prism 1008.

The B-light source device 1010B includes two B-light LED's 1001B. The B-light LED 1001B supplies B-light. The B-light source device 1010B causes the B-light from the B-light LED 1001B to travel in the direction of the TIR prism 1003B that is the predetermined direction. The TIR prism 1003B causes the B-light from the B-light source device 1010B to travel in the direction of the spatial light modulator 1006B. The spatial light modulator 1006B is a tilt mirror device which modulates the B-light from the B-light source device 1010B according to an image signal. The light modulated by the spatial light modulator 1006B passes through the TIR prism 1003B and is incident on the cross dichroic prism 1008.

The cross dichroic prism 1008 which is a color-synthetic optical system includes two dichroic films 1007a and 1007b. The dichroic films 1007a and 1007b are arranged in the X-shape orthogonally to each other. The dichroic film 1007a reflects the R-light, and transmits the G-light. The dichroic film 1007b reflects the B-light, and transmits the G-light. Thus, the cross dichroic prism 1008 synthesizes the R-light, the G-light and the B-light which are respectively modulated by the spatial light modulators 1006R, 1006G, and 1006B. A projection optical system 1011 projects on a screen 1013 the light synthesized by the cross dichroic prism 1008.

By using each color light source device 1010R, 1010G, 1100B, the projector 1000 can supply the light with high efficiency to the spatial light modulators 1006R, 1006Q and 1006B that are objects of illumination. Hereby, an advantage that a bright image can be displayed with high efficiency of light utilization can be obtained. Further, each color light source device 1010R, 1010G, 1010B has the similar constitution to that of the light source device 100 in the first embodiment, or may be have the similar constitution to that of any one of other light source devices in the first to third embodiments.

Figure 11:
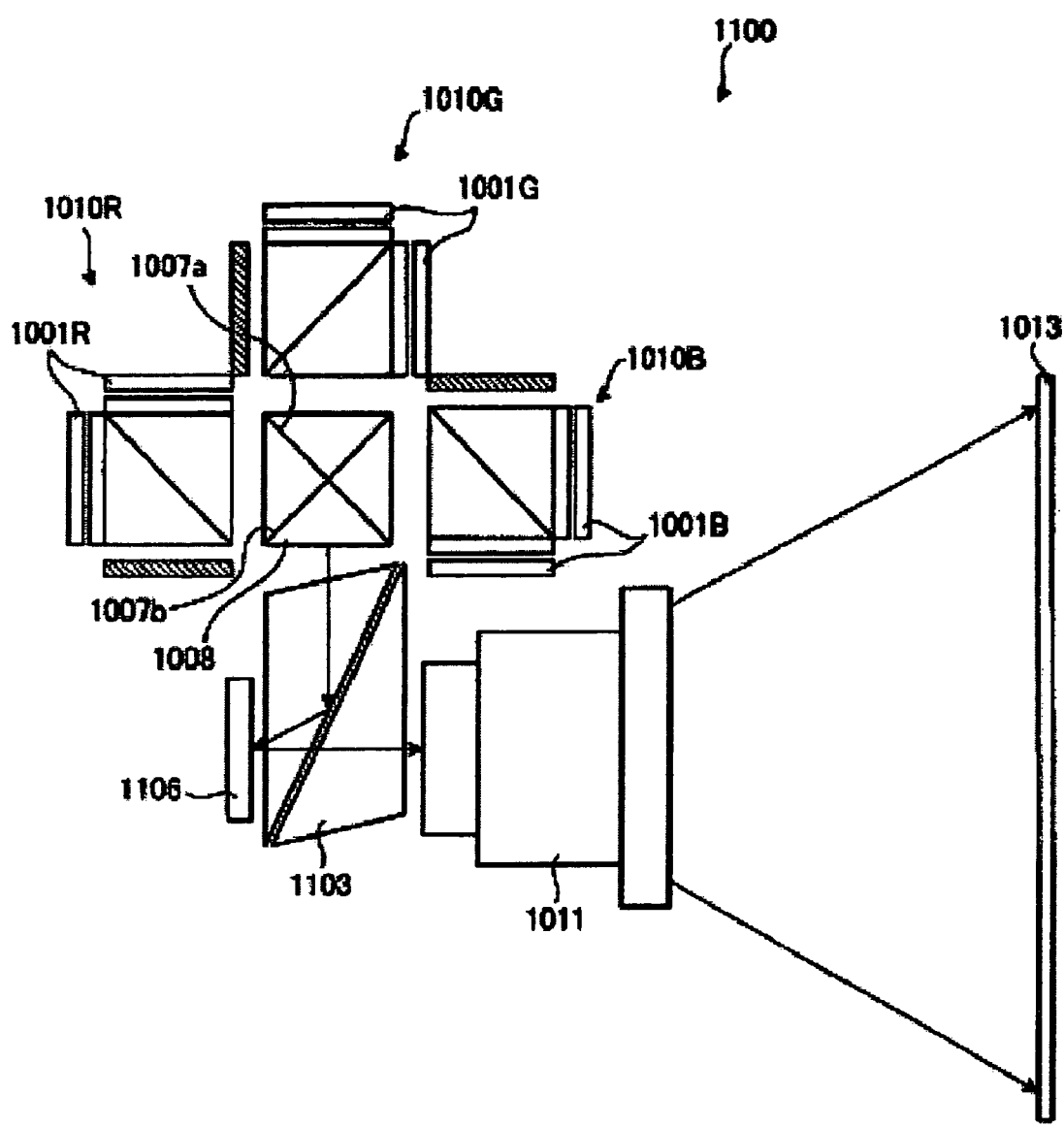
FIG. 11 is a diagram for explaining a modified example of the projector.

FIG. 11 shows the constitution of a projector 1100 that is an image display device according to a modified example in this embodiment. The same components as those in the projector 1000 are denoted by the same reference numerals, and the overlapping description is omitted. The projector 1100 includes a spatial light modulator 1106, that is, it is a single panel type projector. R-light from an R-light source device 1010R, G-light from a G-light source device 1010G, and B-light from a B-light source device 1010B are synthesized by a cross dichroic prism 1008, and the synthesized light is incident on a TIR prism 1103. The TIR prism 1103 causes the light from the cross dichroic prism 1008 to be incident on the spatial light modulator 1106. The R-light source device 1010R, the G-light source device 1010G, and the B-light source device 1010B supply the R-light, the G-light, and the B-light in order so as to modulate their lights in the order, using the single spatial light modulator 1106.

The spatial light modulator 1106 is a tilt mirror device which modulates the R-light from the R-light source device 1010R, the G-light from the G-light source device 1010G, and the B-light from the B-light source device 1010B according to an image signal. The light modulated by the spatial light modulator 1006 passes through the TIR prism 1103 and is incident on a projection optical system 1011. The projector 1100 in this modified example can also display, similarly to the projector 1000, a bright image with high efficiency of light utilization.

Figure 12:
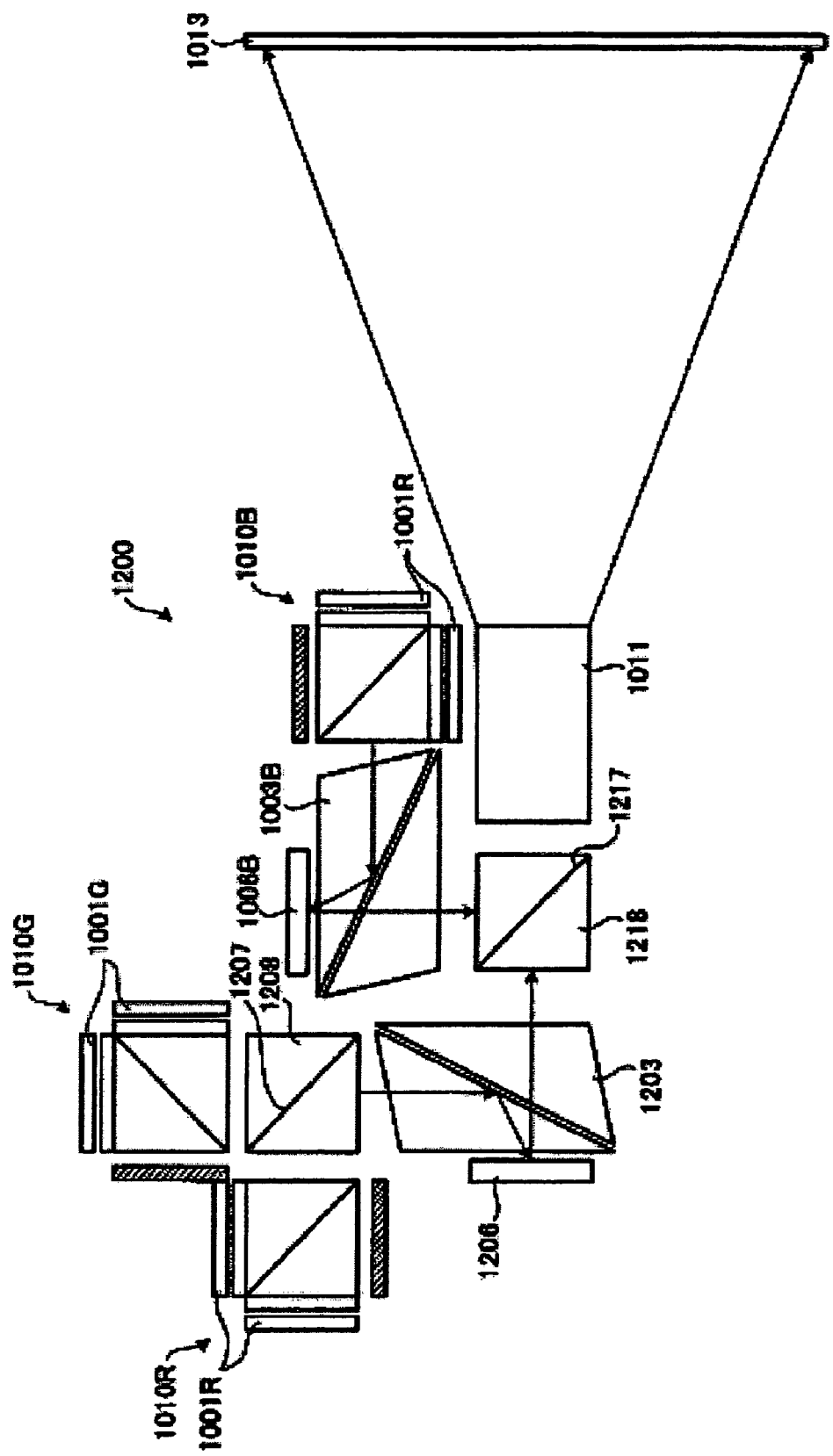
FIG. 12 is a diagram for explaining a modified example of the projector.

FIG. 12 shows the constitution of a projector 1200 that is an image display device according to a modified example in this embodiment. The same components as those in the projector 1000 are denoted by the same reference numerals, and the overlapping description is omitted. The projector 1200 includes two spatial light modulators 1206 and 1006B. R-light from an R-light source device 1010R and G-light from a G-light source device 1010G are synthesized by a dichroic prism 1208, and the synthesized light is incident on a TIR prism 1203. A dichroic film 1207 of the dichroic prism 1208 reflects the R-light and transmits the G-light.

The TIR prism 1203 causes the light from the dichroic prism 1208 to be incident on the spatial light modulator 1206. The spatial light modulator 1206 is a tilt mirror device which modulates the R-light from the R-light source device 1010R, and the G-light from the G-light source device 1010G according to an image signal. The R-light source device 1010R and the G-light source device 1010G supply the R-light and the G-light in the order so as to modulate their lights in the order, using the single spatial light modulator 1206. The light modulated by the spatial light modulator 1206 passes through the TIR prism 1203 and is incident on the dichroic prim 1218.

B-light from a B-light source device 1100B, after being modulated by the spatial light modulator 1006B, is incident on the dichroic prism 1218. A dichroic film 1217 of the dichroic prism 1218 transmits the R-light and the G-light, and reflects the B-light. The dichroic prism 1218 synthesizes the R-light, the G-light, and the B-light, and causes the synthesized light to be incident on a projection optical system 1011. The projector 1200 in this modified example can also display, similarly to the projector 1000, a bright image with high efficiency of light utilization.

The light source device in each of the above embodiments uses the LED as the light emitting part, but the invention is not limited to this. In place of the LED, other solid light emitting elements such as an E1 element and a semiconductor laser may be used. Further, the spatial light modulator used in the projector should modulate the incident light regardless of the polarization state, and it is not limited to the tilt mirror device. Further, the image display device provided with the light source device is not limited to the projector, but may be, for example, a display which looks the light modulated in the spatial light modulator in the face.

As described above, the light source device according to the invention is available in the case that it is used in the projector, and particularly suited to a projector which uses a tilt mirror device as a spatial light modulator.

What is claimed is:

1. A light source device, comprising:
   first and second light emitting parts that emit first light and second light, respectively;
   a polarization separating part that separates each of the first and second lights into first polarized light in a first vibrating direction and second polarized light in a second vibrating direction, respectively, by transmitting the first polarized light and reflecting the second polarized light, the second vibrating direction being substantially orthogonal to the first vibrating direction;
   a mirror reflecting the second polarized light of the first light and the first polarized light of the second light toward each of the first and second light emitting parts that emitted the reflected the first and second polarized lights;
   a phase plate provided between at least one of the first and second light emitting parts and the polarization separating part, the phase plate shifting a phase of incident light by ¼, the first or second polarized lights that is reflected by the mirror and is transmitted in or reflected by the polarization separating part being incident on the phase plate, and
   an optical element that is arranged between at least one of the first and second light emitting parts and the polarization separating part that directs the first or second lights from the first or second light emitting parts to the polarization separating part,
   the first and second light emitting parts including a reflection part that reflects the first or second polarized lights through the phase plate so as to be re-incident on the phase plate, in the direction of the polarization separating part, the first and second light emitting parts being a solid light emitting element,
   the polarization separating part synthesizing the first polarized light that passes through the polarization separating part, and the second polarized light that is reflected on the polarization separating part to cause the synthesized light to travel in a predetermined direction, and
   the optical element being a collective lens which collects the first or second lights from the first or second light emitting parts.

2. The light source device according to claim 1,
   the optical element being a rod integrator which substantially uniformizes the light from the first or second light emitting parts.

3. The light source device according to claim 1,
the optical element being a collimator lens which nearly collimates the first or second lights from the first or second light emitting parts.

4. The light source device according to claim 1, further comprising:
a third light emitting part;
the third light emitting part being disposed such that the first polarized light in the first vibrating direction incident on the polarization separating part from the third light emitting part travels in the direction of the second light emitting part after passing through he polarization separating part, and the second polarized light in the second vibrating direction incident on the polarization separating part from the third light emitting part travels in the direction of the first light emitting part after reflecting on the polarization separating part.

5. The light source device according to claim 1,
the polarization separating part including a first polarization separating part and a second polarization separating part;
the first polarization separating part synthesizing the first and second lights from the first and second light emitting parts provided correspondingly to the first polarization separating part and causing a first synthesized light to travel in a direction of the second polarization separating part; and
the second polarization separating part synthesizing the first and second lights from the first polarization separating part and the first and second lights from the first and second light emitting parts provided correspondingly to the second polarization separating part and causing a second synthesized light to travel in the predetermined direction.

6. An image display device, comprising:
the light source device according to claim 1; and
a spatial light modulator that modulates light outputted from the light source device according to image signals.

* * * * *